July 28, 1953  D. G. GRISWOLD  2,646,816
BACK-FLOW PREVENTION DEVICE
Filed Oct. 5, 1944  6 Sheets-Sheet 1
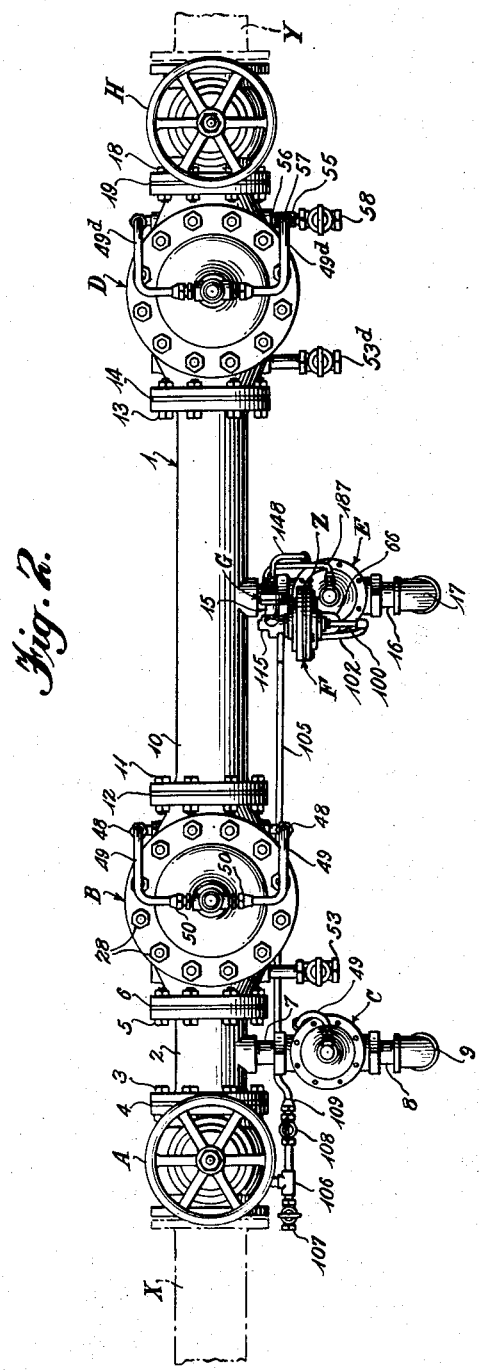
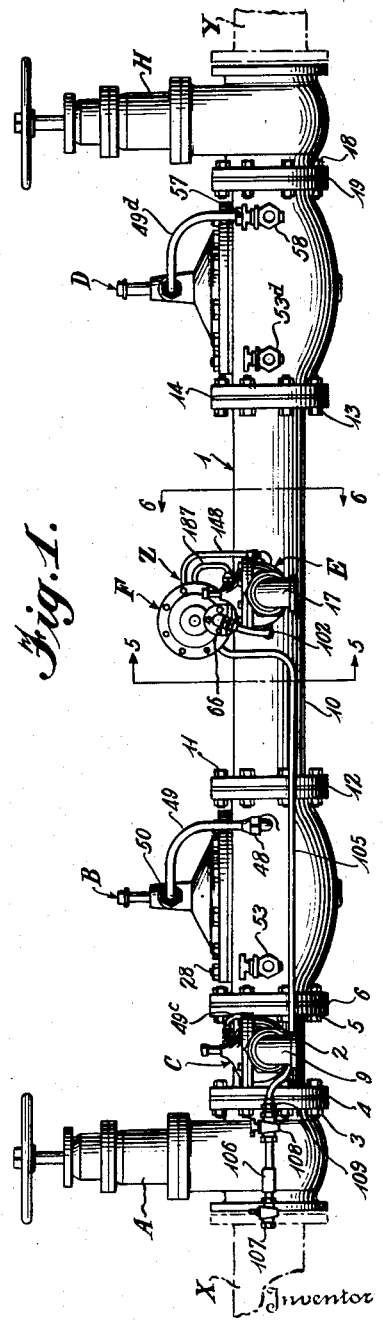
Inventor
Donald G. Griswold
By Bacon + Thomas
Attorneys July 28, 1953  D. G. GRISWOLD  2,646,816
BACK-FLOW PREVENTION DEVICE
Filed Oct. 5, 1944  6 Sheets-Sheet 2

Inventor
Donald G. Griswold
By Bacon + Thomas
Attorneys

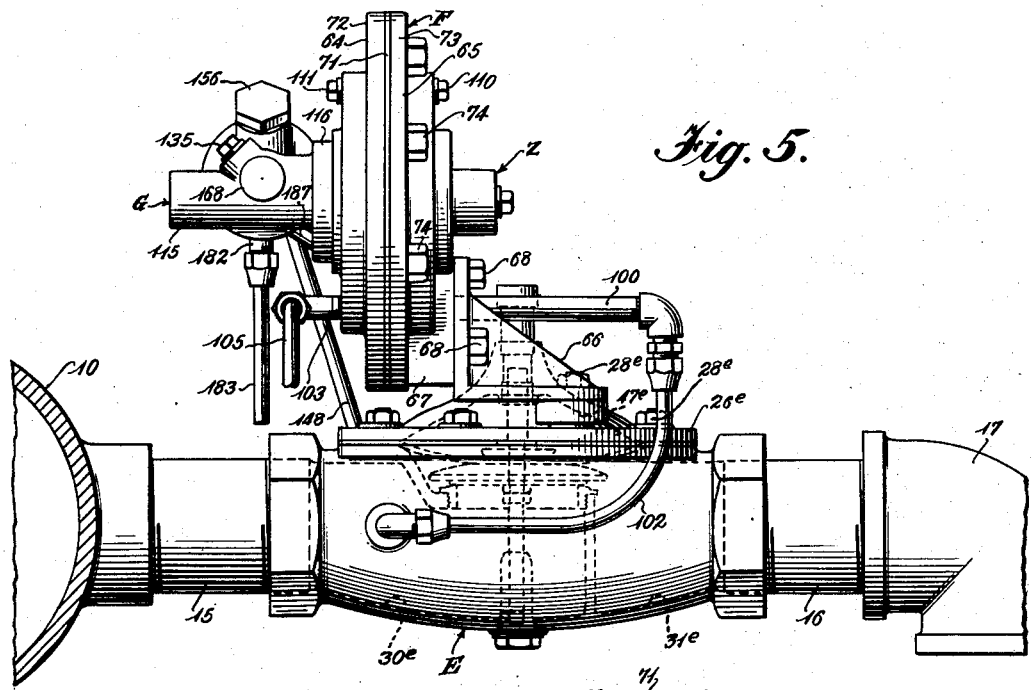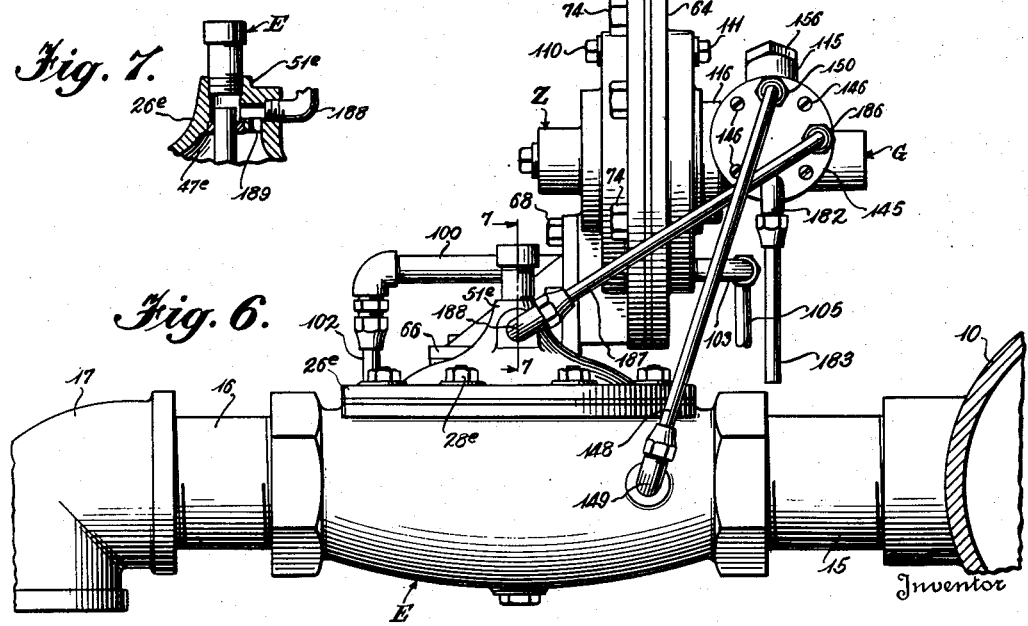

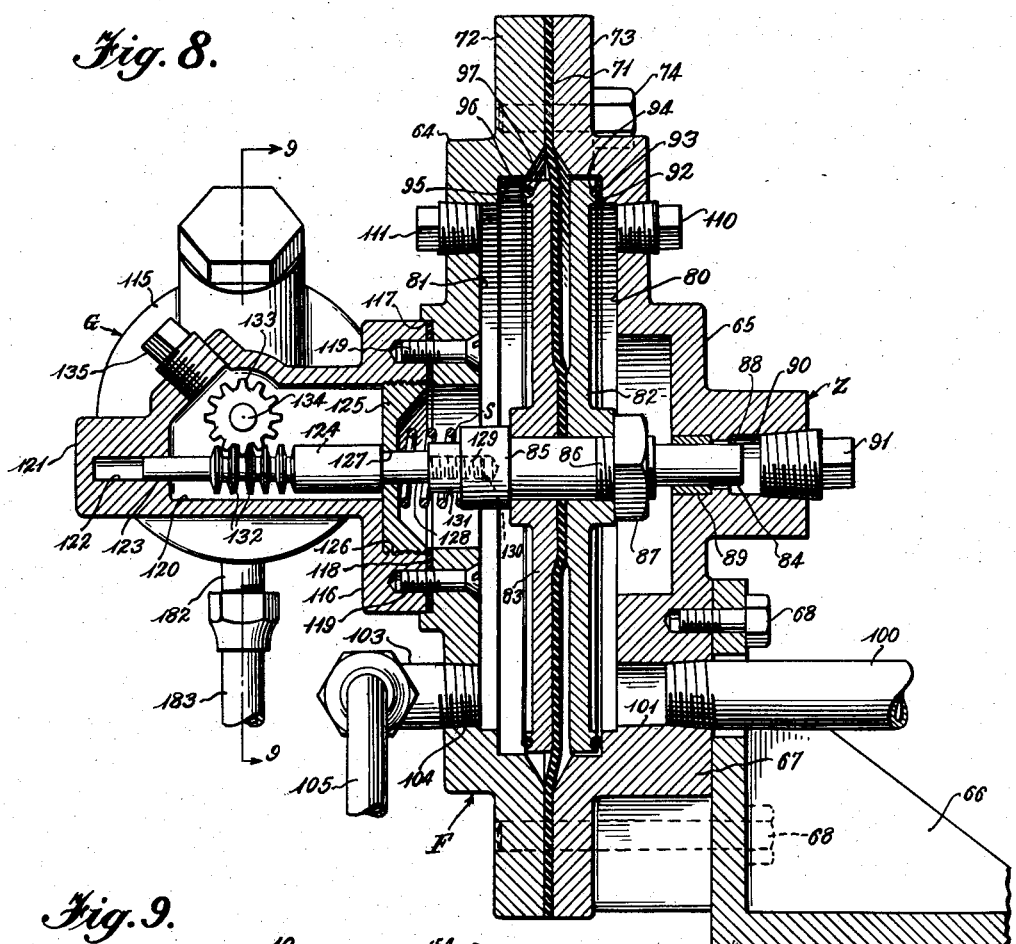

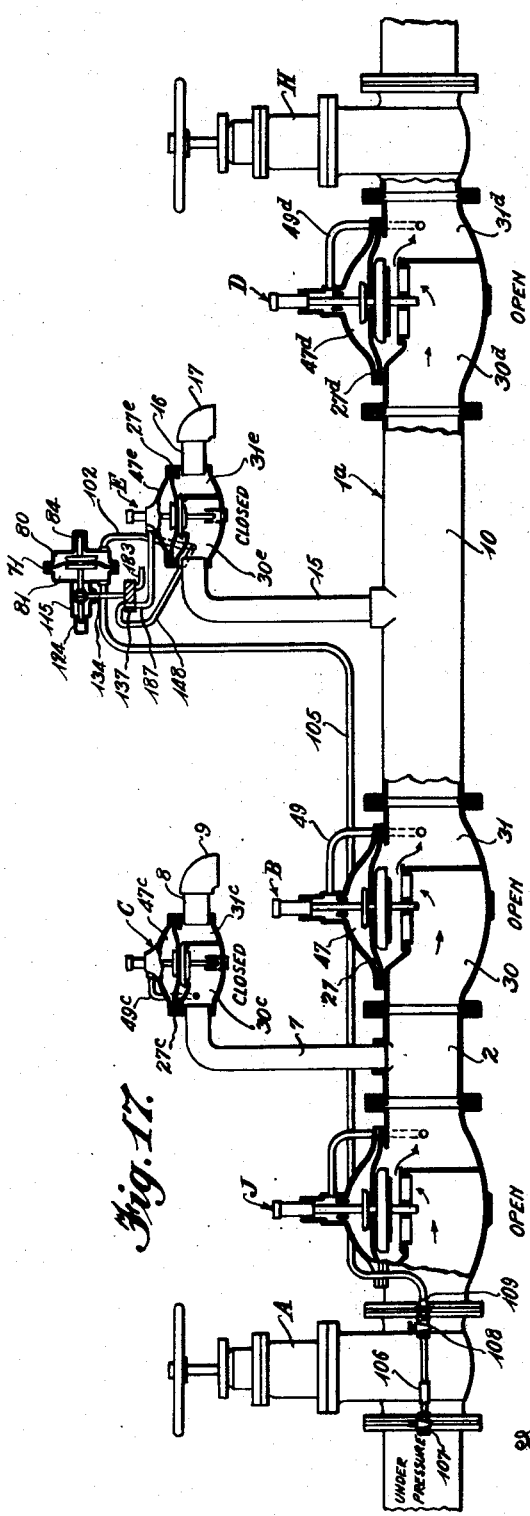

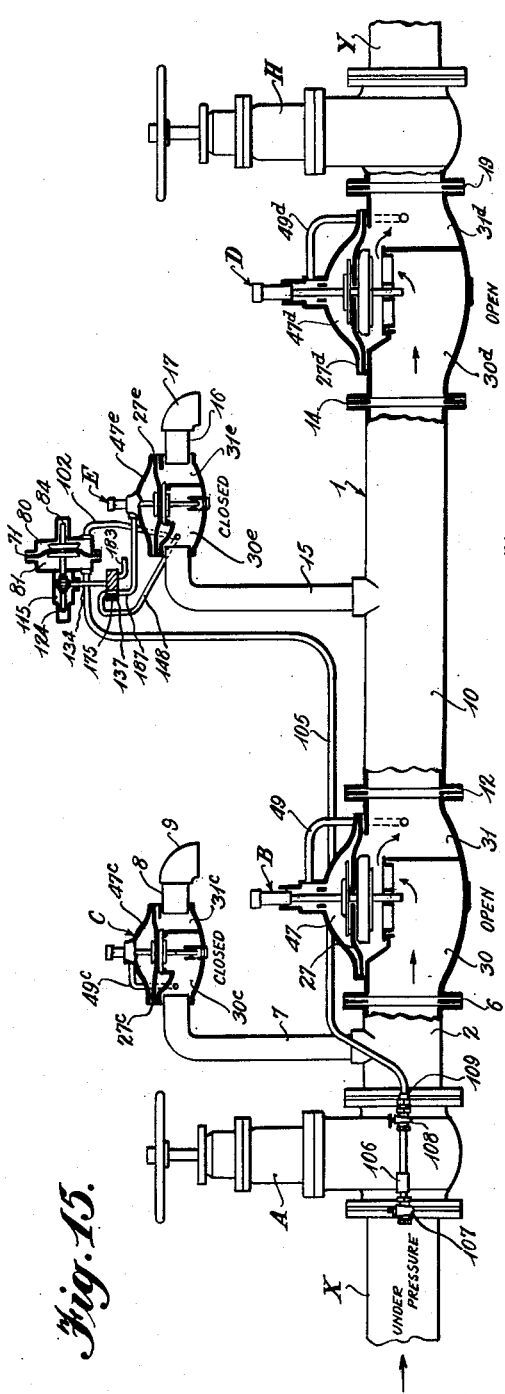
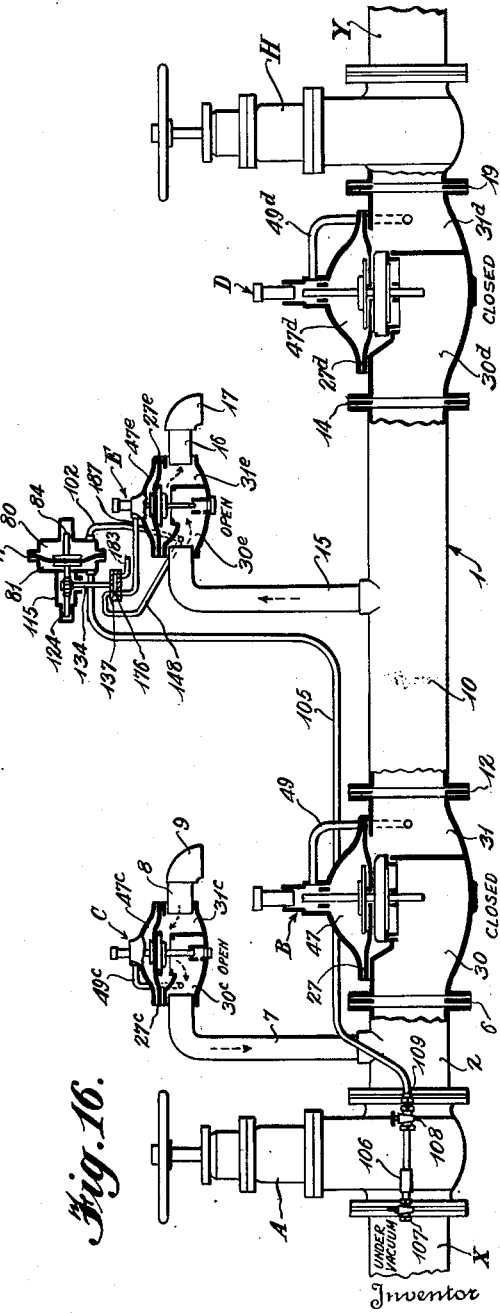

Patented July 28, 1953

2,646,816

UNITED STATES PATENT OFFICE 2,646,816

BACKFLOW PREVENTION DEVICE

Donald G. Griswold, Alhambra, Calif.

Application October 5, 1944, Serial No. 557,345

15 Claims. (Cl. 137—218)

The present invention relates to back-flow protection or prevention units adapted to prevent contamination of public water distribution systems supplying drinking water to dwellings, hotels, factories, shipyards, public buildings, etc.

During recent years sanitary engineers and health authorities have more fully recognized the importance of protecting public water supply systems against contamination resulting from backflow or back-siphonage; that is, the pollution of city water mains by unpotable water as the result of cross connections or back-flow between contaminated water and potable water sources. Many epidemics of amoebic dysentery and other ailments have been directly traced to polluted water supply systems, thus emphasizing the importance of adequate safeguards.

Previous attempts have been made to provide back-flow prevention devices as is evidenced by the U. S. Letters Patent granted to Entriken No. 1,960,144; Dore 2,146,204; Lohmann 2,310,586; and Alpert No. 2,328,118.

While previous attention has been given to the problem of back-flow prevention, no complete solution was produced and the present invention was expressly developed to meet the many difficulties which confronted health officers, sanitary engineers and others concerned with the problem of supplying unpolluted water to consumers.

Accordingly, the principal object of the invention is to provide positive back-flow prevention means which affords a maximum of safety.

Another object of the invention is to provide back-flow prevention means which meets stringent sanitation requirements.

Another object of the invention is to provide dependable back-flow protection means which will guard against all return flow of water from the consumer's pipe system to the water supply mains.

Another object of the invention is to provide a back-flow prevention device including automatic air-vent means in the form of a vacuum breaker for precluding the establishment of a vacuum condition in the water supply main tending to cause back-siphoning of water from the consumer's pipe system into the supply main.

Another important object of the invention is to provide a water supply protection unit that will serve the dual purpose of positively preventing both back-flow past a leaky check valve, and also back-siphoning when the pressure in the supply main drops below that in the property main.

Another object of the invention is to provide a back-flow prevention unit including automatic pressure-responsive check valves which open gradually and remain fully open whenever the pressure at the inlet side of the check valves is greater than that at the outlet side, and which check valves also close gradually and quietly against the water flowing therethrough and are positively held closed when the pressure on the outlet side is greater than, or equal to (under static conditions), that on the inlet side.

A further object of the invention is to provide a back-flow prevention unit including two automatic check valves arranged in tandem, and an automatically controlled bleeder valve between said check valves that is operated in accordance with the pressure differential on the opposite sides of the check valve nearest the supply side of the unit.

A still further object of the invention is to provide a back-flow prevention unit which is automatically drained when the pressure on the consumer's side of the unit becomes greater than that on the supply side of the unit so that all tendency for reverse flow into the water supply main is eliminated.

Another object of the invention is to provide a back-flow prevention unit including means for indicating to the engineer in charge that the check valve nearest the consumer's property is leaking instead of being closed drip-tight.

Still another object of the invention is to provide a back-flow prevention unit including automatic, hydraulically operated check valves constructed so that they do not induce water hammer or line shock.

Still another object of the invention is to provide novel control means for a back-flow prevention unit which will effect bleeding of the unit in the event of leakage past the check valve at the property end of the unit and which will also bleed the unit in the event that a vacuum condition occurs on the supply side of the unit.

A still further object of the invention is to provide a back-flow prevention device that is adapted to be completely assembled at the factory, shipped in toto, and readily installed in a water supply line as an assembled unit.

Other objects of the invention will be apparent from the following description taken in conjunction with the accompanying drawings in which:

Figure 1 is a front elevational view of a backflow prevention unit embodying two automatic check valves arranged in tandem, an automatic vacuum breaker valve on the supply side of the unit, a bleeder valve between the check valves, and automatic control means for said bleeder valve, all constructed and arranged in accordance with the principles of the present invention;

Figure 2 is a plan view of the back-flow prevention unit shown in Figure 1;

Figure 5 is a side elevational view of the bleeder valve and the control means therefor, as viewed along the line 5—5 of Figure 1, said control means including a pilot valve and a pressure-responsive device for actuating said pilot valve;

Figure 6 is a view similar to Figure 5, but taken upon the opposite side of the bleeder valve and control means, as viewed along the line 6—6 of Figure 1;

Figure 7 is a fragmentary sectional view of a portion of the bleeder valve taken on the line 7—7 of Figure 6;

Figure 8 is an enlarged sectional view through the pilot valve and the pressure-responsive control means therefor;

Figure 9 is a sectional view through the pilot valve taken along the line 9—9 of Figure 8;

Figure 10 is a sectional view taken along the line 10—10 of Figure 9, showing the base member of the pilot valve in elevation;

Figure 11 is a view of the gasket which is interposed between the base member and the housing of the pilot valve;

Figure 12 is a view of the pilot disc seat of the pilot valve;

Figure 13 is a view of the pilot disc;

Figure 14 is an enlarged sectional view through the pilot disc taken along the line 14—14 of Figure 13;

Figure 15 is a schematic view of the back-flow prevention unit illustrating the relative positions of the various elements thereof during normal flow through the unit;

Figure 16 is a view similar to Figure 15, but illustrating the relative positions that the elements of the unit assume to prevent back-siphoning of water through the unit when a vacuum condition is created in the line in which the unit is connected; and Figure 17 is a schematic view of a modified form of back-flow prevention unit including three automatic check valves.

Figure 4:
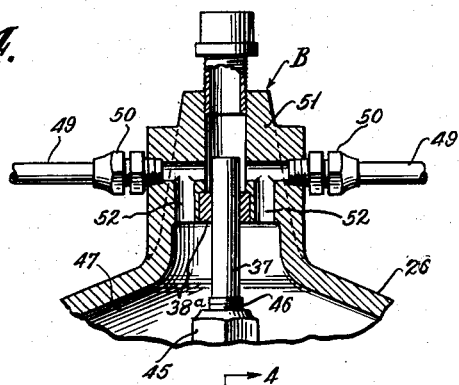
Figure 4 is a fragmentary sectional view taken along the line 4—4 of Figure 3.

One practical form of back-flow prevention unit embodying the principles of the present invention is illustrated in full lines in Figures 1 and 2, and is generally identified by the numeral 1. The letter A indicates a conventional gate or shut-off valve, the inlet side of which is connected to a supply main X, shown in dot and dash lines. The outlet side of the gate valve A is connected to one end of a pipe section 2 by a series of bolts 3, a conventional gasket 4 being interposed between the valve A and the pipe section 2. The opposite end of the pipe section 2 is connected with the inlet of a first automatic check valve B by bolts 5, a suitable gasket 6 being interposed between the valve B and the adjacent end of the pipe section 2. One end of a pipe nipple 7 (Figs. 2, 5 and 6) is connected with a boss on the pipe section 2 and the opposite end of said nipple is connected with an automatic vacuum breaker valve C. The outlet side of the vacuum breaker C is connected to one end of a pipe nipple 8 and an elbow 9 is connected to the opposite end of said pipe nipple. The open end of the elbow 9 communicates with the atmosphere and is preferably left unthreaded so that it cannot receive a pipe plug or be connected with other piping to defeat the proper function of the valve C.

A second pipe section 10 has one end thereof connected with the outlet side of the check valve B by a series of bolts 11, a suitable gasket 12 being interposed between the valve B and the pipe section 10. The opposite end of the pipe section 10 is connected with the inlet of a second automatic check valve D, by bolts 13, a suitable gasket 14 being interposed between the end of the pipe section 10 and the adjacent side of the valve D. One end of a pipe nipple 15 (Figs. 2, 5 and 6) is threaded into a boss on one side of the pipe section 10 and the opposite end of said pipe nipple is connected with the inlet of a bleeder or back-flow indicator valve E. The outlet side of the bleeder valve E is connected with a pipe nipple 16 and an elbow 17, similar to the pipe nipple 8 and elbow 9 associated with the vacuum breaker valve C.

A control device Z consisting of a pressure-responsive device F and a pilot valve G actuated by said pressure-responsive device is conveniently mounted upon the bleeder valve E in a manner which will be explained in greater detail hereinafter. However, it may be mentioned at this point that the control device Z is arranged to automatically effect opening of the bleeder valve E, whenever the pressure in the pipe section 10 exceeds that in the supply main X, or whenever the pressure in the supply main X is less than that in the pipe section 10.

The outlet side of the second check valve D is connected with the inlet of a conventional gate or shut-off valve H by bolts 18, a suitable gasket 19 being interposed between the valves D and H. The outlet side of the gate valve H is connected with a service pipe Y (shown in dot and dash lines) on the property or consumer's side of the back-flow prevention unit 1.

Figure 3:
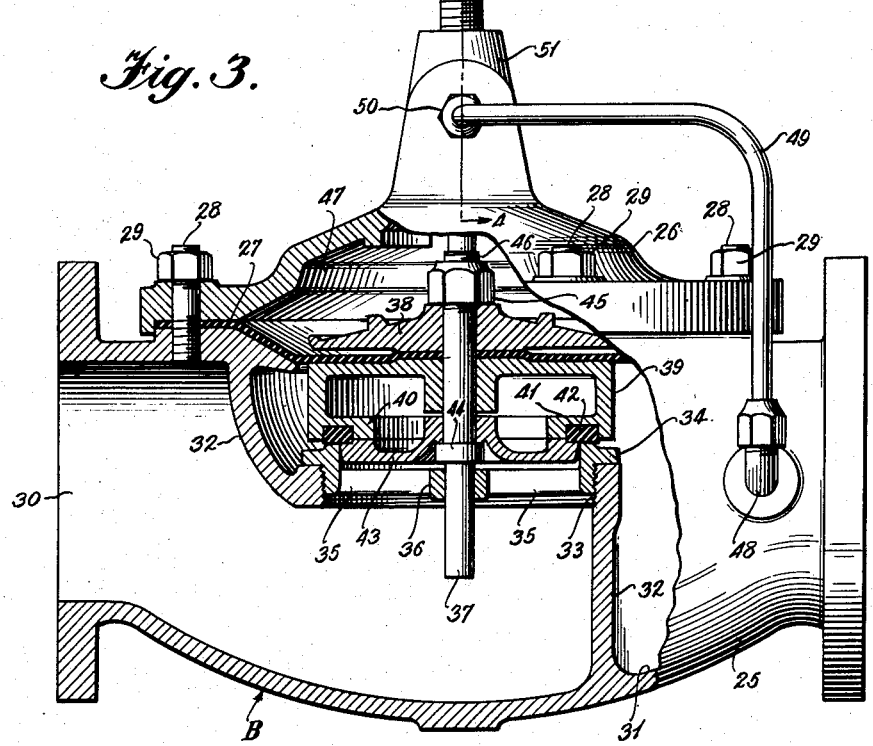
Figure 3 is a view partly in section of one of the automatic check valves of the back-flow prevention unit shown in Figure 1.

The automatic check valves B and D are of the same size and capacity, and preferably embody the detailed construction shown in Figures 3 and 4 in order to assure quiet operation of the unit 1. On the other hand, the vacuum breaker valve C and the bleeder valve E may also be of like size and capacity, but preferably are of a smaller size and capacity than the valves B and D, for economic and practical reasons. However, it will be understood that the relative sizes of the valves B, C, D and E may be varied to meet the requirements of any particular installation or sanitary code. As one illustrative example, the valves B and D may be six-inch valves; whereas, the valves C and E may only be two-inch valves.

The valves A and H can be closed to isolate the unit 1 from the mains X and Y in the event that any repairs must be made to any of the remaining elements of said unit.

Referring now to Figures 3 and 4, the automatic check valve B has been chosen for descriptive purposes, but it will be understood that the valve D is of identically the same construction and that when reference is made hereinafter to parts of the valve D corresponding to the valve B, the same reference numerals will be employed but the exponent *d* will be added. For convenience, the same plan of identification will be applied in referring to the parts of valves C and E generally corresponding to the parts of the valve B.

The check valve B comprises a body 25, a cover 26, and a diaphragm 27 arranged between said body and cover. A series of studs 28 is mounted in the body 25 and each extends through the diaphragm 27 and cover 26 and receives a nut 29 for securing said body, diaphragm and cover in assembled relation. The body 25 includes an inlet opening or chamber 30 and an outlet opening or chamber 31 separated by partition means 32 provided with an opening 33 establishing communication between said inlet and outlet chambers. A removable seat 34 is threadedly mounted in the opening 33 and is provided with a plurality of radial arms 35 which merge centrally and provide a guide 36 for the lower end of a valve stem 37. The upper end of the valve stem 37 is guided in a bushing 38ª (Figure 4) mounted in the cover 26. Valve stem 37 extends through a central opening in the diaphragm 27 and carries a disc-like diaphragm supporting plate 38 which engages a portion of the upper surface of the diaphragm 27 and also carries a lower diaphragm supporting member 39 which engages a portion of the lower side of said diaphragm. The member 39 has an inwardly projecting flange 40 at its lower side provided with an annular recess 41 in which an annular sealing disc 42 is seated. The sealing disc 42 is adapted to engage the upper surface of the seat 34 when the valve is closed to prevent all flow between the inlet chamber 30 and the outlet chamber 31.

The valve stem 37 further carries a retainer plate 43 for maintaining the sealing disc 42 in the recess 41. The retainer plate 43 is engaged by an enlargement 44 on the valve stem 37 and is clampingly secured against the sealing disc 42 and is maintained in assembled relation with the diaphragm supporting member 39 and the plate 38 by an elastic lock nut 45 which is mounted upon a threaded portion 46 of the valve stem 37.

The cover 26 is dished to provide a chamber 47 above the diaphragm 27 adapted to receive fluid under pressure for effecting downward flexing of the diaphragm 27 to cause the sealing disc 42 to engage with the seat 34 and thus close the valve B.

The check valve B (and also the check valve D) is constructed so that closing thereof is automatically effected when the pressure in the outlet opening thereof is greater than that in the inlet. In order to accomplish such automatic operation, fluid for effecting closing of the valve is conveniently taken from the outlet chamber of the respective valves. Thus, the valve B has a conventional elbow 48 threaded into a tapped opening in the side wall thereof in the zone of the outlet chamber 31 and one end of a conduit 49 is connected with said elbow, the opposite end of said conduit being connected by a conventional fitting 50 with a boss 51 formed on the cover 26. The fitting 50 communicates with a passageway 52 leading to the diaphragm pressure chamber 47. One conduit 49 may be sufficient for certain installations, but in order to speed up the operation of the valve, two conduits 49 may be employed, as best shown in Figure 2. A test cock 53 (Figs. 1 and 2) communicates with the inlet chamber 30 of the valve B and may be open to determine the presence of fluid in said inlet chamber.

It will be apparent from the foregoing that whenever the pressure in the outlet chamber 31 of the valve B exceeds that in the inlet chamber 30, the outlet pressure will be communicated through the conduits 49 to the diaphragm pressure chamber 47 to effect downward flexing of the diaphragm 27 with consequent downward movement of the valve stem 37 to move the sealing disc 41 into engagement with the seat 34 to cut off all flow through the valve. The design and construction of the valve B is such that the differential pressure in the inlet and outlet openings 30 and 31 required to open or close the valve does not exceed 1 lb. per square inch so that sensitive valve operation is assured. Even under static flow conditions, that is, when the pressure in the inlet chamber 30 equals the pressure in the outlet chamber 31, the valve B will close because of the fluid pressure acting on the area of the diaphragm 27 exposed to the pressure of the fluid in the diaphragm chamber 47 and because of the weight of the valve stem 37, member 39, etc., tend to flex said diaphragm toward closed position. The valve B always closes against reverse flow, gradually, and without shock, thereby eliminating all operating noise, hammering and line shock. The closing rate of the valve B can be determined by the number of conduits 49 employed and also by the internal diameter of such conduits in order to admit fluid into the diaphragm chamber 47 at a predetermined desired rate. On the other hand, when the pressure in the inlet 30 exceeds that in the outlet 31, the valve B will open gradually, and remain fully open so long as the inlet pressure is the greater.

The check valve D has a test cock 53ᵈ (Figs. 1 and 2) communicating with the inlet chamber thereof and also has two conduits 49ᵈ connecting the outlet chamber thereof with the diaphragm chamber thereof. However, the manner of connecting the conduit 49ᵈ at the front of the valve as viewed in Figure 1 is modified so as to include a pipe-T 55 (Fig. 2) which has one end of the head thereof connected with the outlet chamber of the valve D by a pipe nipple 56, the stem of the pipe-T being connected by a conventional fitting 57 to one end of the conduit 49ᵈ. The opposite end of the head of the pipe-T 55 is connected with a test cock 58, which may be opened to reveal the presence of fluid in the outlet chamber of the valve D. Of course, it will be understood that a pressure gauge (not shown) may be connected with the test cocks 53, 53ᵈ and 58 in order to determine the pressure conditions at these points in the back-flow prevention unit 1, if desired.

Referring to Figure 15, the automatic vacuum breaker valve C is here diagrammatically illustrated in cross-section, and it will be noted that, in contrast with the check valves B and D, the vacuum breaker valve C has its diaphragm chamber 47ᶜ connected by a conduit 49ᶜ with the inlet opening 30ᶜ thereof instead of with the outlet opening 31ᶜ. Hence, the vacuum breaker valve C will be maintained closed so long as the pressure in the inlet opening 30ᶜ exceeds that in the outlet opening 31ᶜ; the outlet opening 31ᶜ, as previously pointed out, communicates with the atmosphere through the pipe nipple 8 and elbow 9. The vacuum breaker valve C is also extremely sensitive and is designed to open in the event that a vacuum as low as one inch should occur in the supply line X. If such vacuum condition should occur, atmospheric pressure will immediately act upon the under side of the diaphragm 27ᶜ to effect opening of the valve and thus vent the supply line X to the atmosphere at a point between the shut-off valve A and the first check valve B. Atmospheric pressure can then readily force the liquid from the diaphragm chamber 47ᶜ through the conduit 49ᶜ because of the absence of positive pressure in the inlet chamber 30ᶜ.

By way of further contrast, the bleeder or back-flow indicator valve E is not directly responsive to the pressure in either its inlet chamber 30ᵉ or its outlet chamber 31ᵉ, but is positively controlled in its opening and closing movements by the pressure-responsive device F of the control means Z and the pilot valve G which is actuated by said pressure-responsive device F, as will be explained more fully hereinafter.

Referring now to Figures 5 and 8, the pressure-responsive device F comprises housing sections 64 and 65. A bracket 66 is secured to a boss 67 on the housing section 65 by three bolts 68. The bracket 66 in turn is mounted upon the cover 26ᵉ by one of the stud bolts 28ᵉ. A flexible diaphragm 71 is clamped at its outer margin between a flange 72 (Fig. 8) of the housing section 64 and a flange 73 of the housing section 65. A plurality of bolts 74 secures the housing sections 64 and 65 and the diaphragm 71 in assembled relation, the two lowermost bolts 68 being of relatively greater length and serving the dual purpose of mounting the pressure-responsive device F on the bracket 66 and also securing the housing sections 64 and 65 together.

The internal construction of the pressure-responsive device F is best illustrated in Figure 8 to which reference is now specifically made. It will be noted from this figure that the diaphragm 71 cooperates with the housing section 65 to provide a pressure chamber 80 and also cooperates with the housing section 64 to provide a pressure chamber 81. A backing plate 82 is disposed in the chamber 80 at one side of the diaphragm 71 and a backing plate 83 is disposed in the chamber 81 on the opposite side of said diaphragm. A stem 84 extends through the backing plate 82, the diaphragm 71 and the backing plate 83 and has an enlargement 85 providing a shoulder engaging the outer surface of the backing plate 83. The stem 84 has an intermediate threaded portion 86 and a nut 87 threaded on said portion clampingly maintains the backing plates 82 and 83, and the diaphragm 71 in assembled relation. The stem 84 has a reduced end 88 which is slidably received in a bushing 89 mounted in the inner end of a passage 90 in the housing section 65. The outer end of the passage 90 is closed by a plug 91.

The inner surface of the housing section 65 is provided with an annular seat 92 adapted to be engaged by a packing ring 93, which is circular in cross section, received in a groove 94 formed in the outer confronting face of the backing plate 82. The housing section 64 is provided with a similar annular seat 95 and the backing plate 83 is provided with a similar packing ring 96 received in a groove 97. The importance and purpose of the packing rings 93 and 96 will be set forth more fully hereinafter.

One end of a pipe nipple 100 is threaded into a passageway 101 in the housing section 65 and communicates with the chamber 80 at the lower portion thereof. The opposite end of the pipe nipple 100 is connected by a conduit 102 (Fig. 5) with the inlet chamber 30ᵉ of the bleeder valve E. Thus, the chamber 80 of the pressure-responsive device F always communicates with and is subject to variations in pressure corresponding to those which occur in the inlet chamber 30ᵉ.

An elbow fitting 103 is threaded into an opening 104 (Fig. 8) in the housing section 64 and communicates with the chamber 81 at the lower portion thereof. One end of a conduit 105 is connected to the elbow 103 and the opposite end of said conduit communicates with the gate valve A, as best illustrated in Figures 1 and 2. Thus, a T-fitting 106 is mounted on the gate valve A so as to be in communication with the inlet side thereof. A test cock 107 is connected with one end of the T-fitting 106 for determining the presence of fluid on the inlet side of the valve A. A shut-off cock 108 is connected with the other side of the T-fitting 106 and a conventional connector fitting 109 connects the conduit 105 with the shut-off cock 108. The test cock 107 is normally closed and the cock 108 is normally open so that the inlet side of the gate valve A communicates with the chamber 81 of the pressure-responsive device F through the conduit 105.

The housing section 65 has a vent plug 110 that may be removed to permit the escape of air from the chamber 80 when the pressure-responsive device F is first set up for operation. The housing section 64 has a similar plug 111 for venting the chamber 81.

It will be apparent from the foregoing description, that the pressure-responsive device F is connected around the valve B and will be actuated in accordance with the pressure differential existing between the pressure in the inlet chamber 30ᵉ of the bleeder valve E and that in the inlet chamber of the gate valve A. Accordingly, the diaphragm 71 will be flexed either toward the left or toward the right (as viewed in Fig. 8) depending upon whether the chamber 80 or 81 contains the higher pressure. The diaphragm 71 is shown flexed toward the right, which is the normal position of said diaphragm corresponding to the existence of a higher pressure at the inlet side of the gate valve A, than exists at the inlet of the bleeder valve E.

The pilot valve mechanism G (Fig. 8) includes a housing 115 having a flange 116 at one side thereof for conveniently mounting said mechanism on the housing section 64. To this end the housing section 64 is suitably counterbored as indicated at 117. A gasket 118 is interposed between the base of the counterbore 117 and the adjacent face of the flange 116 to form a leakproof seal. A plurality of countersunk screws 119 extends through the side wall of the housing section 64 into the flange 116 and rigidly secures the pilot valve housing 115 to the housing section 64.

The pilot valve housing 115 contains a chamber 120, closed at one end by a wall portion 121 provided with a bore 122 serving as a guide for one end 123 of a rod 124. The chamber 120 is closed at its opposite end by a disc 125 mounted in a threaded recess 126 formed in the flange 116. The disc 125 has a central opening 127 which serves as a guide for the opposite end portion 128 of the rod 124. The rod portion 128 carries a reduced threaded extension 129 which is received in a threaded opening 130 formed in the enlargement 85 of the stem 84. A spacer 131 is interposed between the rod portion 128 and the enlargement 85. The stem 84 and the rod 124 are thus interconnected by the threaded portion 129 for simultaneous reciprocating movement. The spacer 131 cooperates with the disc 125 to limit the travel of the stem 84 and the rod 124 toward the left, as viewed in Figure 8. Correspondingly, the shoulder provided by the rod portion 128 cooperates with the disc 125 to limit movement of the rod 124 and stem 84 toward the right, as shown.

The rod 124 is provided with a series of spaced ridges 132 that mesh with the teeth of a pinion 133 disposed in the chamber 120 and mounted upon one end of a pilot drive shaft 134. A removable plug 135 provides access to the chamber 120.

Referring now to Figure 9, the pilot valve housing 115 is further provided with a chamber 136 adapted to receive operating fluid under pressure. A pilot disc 137 is disposed in the pressure chamber 136 and engages a seat member 138 which forms a closure for the open end of the pressure chamber 136. The seat 138 is secured to the housing 115 by a plurality of countersunk screws 139.

A fluid distribution base 145 is secured to the pilot valve housing 115 by a plurality of screws 146, a gasket 147 being interposed between the base member 145 and the pilot valve housing 115 to provide a fluid-tight seal therebetween.

Operating fluid under pressure is supplied to the pressure chamber 136 of the pilot valve through a conduit 148 (Fig. 6) one end of which is connected by a conventional fitting 149 with the inlet chamber of the bleeder valve E and the opposite end of which is connected by a conventional fitting 150 with a passage 151 in the base member 145. The passage 151 is aligned with a passage 152 in the gasket 147, and a passage 153 in the housing 115. The passage 153 discharges into a chamber 154 having a threaded opening 155 in which is mounted a plug 156 having a strainer 157 through which the fluid must pass before it can enter a passage 158 communicating directly with the pressure chamber 136. It will be clear from the foregoing that the pressure chamber 136 contains operating fluid under substantially the same unit pressure as that prevailing in the inlet opening of the bleeder valve E.

The pilot drive shaft 134 extends through an opening 161 in the pilot valve housing 115 and projects into the pressure chamber 136. The end of the pilot drive shaft 134 adjacent the pilot disc 137 carries a drive washer 162 provided with pins 163 which project into recesses 164 (Fig. 13) provided in one face of the pilot disc 137, whereby to transmit a drive from the drive washer 162 to the pilot disc 137. A washer 166 disposed at the end of the pressure chamber 136 opposite the seat 138 provides a bearing for one end of the pilot drive shaft 134, and the opposite end of said shaft is journaled in a bore 167 formed in a boss 168 on the housing 115. Packing material 169 is disposed in the opening 161 and surrounds the shaft 134, and a gland 170 compresses said packing into sealing engagement with said shaft to prevent leakage of operating fluid from the pressure chamber 136 into the chamber 120 containing the pilot pinion 133 and the rod 124.

The porting of the pilot disc 137 is best illustrated in Figures 13 and 14. It will be observed that a pressure port 175 extends completely through the pilot disc 137 and that a U-shaped exhaust port 176 has one leg 177 thereof disposed on the axis of the disc and its other leg 178 located the same distance from the axis of the disc as the port 175, but on a radius at an angle of 60° from said through-port.

The pilot seat 138 is shown in detail in Figure 12 and is provided with an axial port 177ª that constantly registers with the axial leg 177 of the exhaust port 176 of the pilot disc 137. The seat 138 is further provided with port 179 radially spaced from the port 177ª the same distance that the through-port 175 is spaced from the axis of the pilot disc 137, so that the pressure port 175 and the leg 178 of the exhaust port 176 can alternately register with the port 179 in the seat 138 in the two operative positions of the pilot disc 137.

The gasket 147 (Fig. 11) has ports 177ᵇ and 179ᵇ adapted to be aligned with the ports 177ª and 179, respectively, of the seat 138.

The base member 145 has an axial passageway 177ᶜ aligned with the ports 177ª and 177ᵇ. The passage 177ᶜ includes a radial portion 180 (Fig. 10) that terminates in an enlarged threaded opening 181 having a conventional elbow fitting 182 mounted therein and to which one end of a drain tube 183 is secured. The opposite end of the drain tube 183 may be open to the atmosphere, as shown, or connected with a suitable waste pipe (not shown) as desired.

The base member 145 also has a passageway 179ᶜ (Fig. 10) aligned with the ports 179 and 179ᵇ and includes a radial portion 184 which terminates in an enlarged threaded opening 185 in which is mounted a conventional fitting 186 having one end of a conduit 187 connected therewith, the opposite end of said conduit being connected by conventional fitting 188 (Figs. 6 and 7) with a boss 51ᵉ on the cover 26ᵉ of the bleeder valve E. Communication between the conduit 187 and the diaphragm chamber 47ᵉ is established by a passageway 189 (Fig. 7).

Figure 1 shows the siphon breaker valve C and the bleeder valve E in substantially the same horizontal plane as the check valves B and D. However, in order to facilitate graphic illustration of the mode of operation of the back-flow prevention unit 1, the valves C and E have been schematically drawn in a plane lying above the valves B and D.

Assuming that the back-flow prevention unit shown in Figure 1 has been properly installed between the water supply main X and the property main Y, and further assuming that the gate valves A and H have been manually opened and that a normal flow of water is occurring from the main X to the service line Y, the various valves B, C, D and E will assume the relative positions illustrated in Figure 15, and the control device Z will assume the corresponding position shown in said figure. Thus, the automatic check valves B and D are both wide open for the reason that the pressure in the inlet chambers 30 and 30ᵈ thereof is substantially greater than that in their respective outlet chambers 31 and 31ᵈ, whereby the diaphragms 27 and 27ᵈ are flexed upwardly to permit free flow through said valves. During such normal flow, the pressure in the chamber 81 of the pressure-responsive device F is correspondingly greater than that in the chamber 80 thereof so that the diaphragm 71 is flexed toward the right and the pilot disc 136 assumes the position diagrammatically illustrated in Figure 15 with the through-port 175 establishing communication between the inlet chamber 30ᵉ of the valve E and the diaphragm pressure chamber 47ᵉ of said valve to maintain said valve closed drip-tight. Such communication is established through the conduit 148 which supplies operating fluid under pressure to the pressure chamber 136 as aforedescribed, through the port 177ᶜ of the pilot disc 137 and thence through seat port 179, gasket port 179ᵇ, and port 179ᶜ and passage 184 in the base 145 into the conduit 187 leading to the diaphragm pressure chamber 47ᶜ. Simultaneously, the pressure in the inlet opening 30ᶜ of the vacuum breaker valve C is communicated to the diaphragm chamber 47ᶜ of said valve and acts upon the diaphragm 27ᶜ to maintain said valve closed drip-tight. In other words, during normal flow through the back-flow prevention unit 1, the check valves B and D are wide open, and the bleeder valve E and the vacuum breaker valve C are tightly closed.

It is important to note that when the diaphragm 71 is flexed toward the right, the packing ring 93 (Fig. 8) engages the seat 92 of the housing section 65 to form a tight seal therewith. So long as the pressure in the chamber 81 is in excess of that in the chamber 80, this seal will be maintained. If the diaphragm 71 should fail for any reason, such seal will prevent the passage of fluid from the chamber 81 into the chamber 80, so that no fluid can by-pass the pressure-responsive device F and gain entrance into the pipe section 10. More important, however, is the cooperation of the packing ring 96 with the seat 95 to provide a similar tight seal in the event that the pressure in the chamber 80 exceeds that in the chamber 81 and the diaphragm 71 should fail for any reason. In the latter situation, the seal provided by the packing ring 96 will prevent by-passing of possibly contaminated water around the check valve B from the pipe section 10 into the main X through the conduits 102 and 105 which are connected with the chambers 80 and 81, respectively, of the pressure-responsive device F.

Assuming now that the pressure in the supply main X drops to a value below that of the pressure in the service pipe Y, due to sudden demands by other consumers on the supply main X, or for other reasons, the check valves B and D will automatically close tightly upon a slight drop in pressure in their inlet openings below that in their respective outlet openings. The closing of the check valves B and D occurs quickly, although gradually, so that no hammering or line shock results. Normally, both check valves B and D will remain closed until the pressure conditions are reversed and no back-flow can occur through the unit 1. Under these conditions the vacuum breaker valve C and the bleeder valve E will also be tightly closed.

If it is assumed that the second check valve D, which is nearest to the service pipe Y or the consumer's side of the unit 1, should leak for any reason so that the pressure in the pipe section 10 between the check valves B and D becomes greater than that in the supply main X, such pressure will be immediately transmitted through the conduit 102 to the chamber 80 of the pressure-responsive device F to effect flexing of the diaphragm 71 towards the left as viewed in Figures 8 and 16, with a consequent shifting of the stem 84 and rod 124 in the same direction so that the ridges 132 on said rod cooperate with the teeth on the pinion 133 to turn the pilot disc 137 through an angle of about 60° from the position previously occupied to one in which the exhaust port 176 of said pilot disc interconnects the seat ports 177ᵃ and 179. Such positioning of the pilot disc 136 will effect immediate full opening of the bleeder valve E by establishing communication between the diaphragm chamber 47ᵉ of said bleeder valve and the atmosphere, as follows: fluid will drain from the diaphragm chamber 47ᵉ through the conduit 187, passage 184 and port 179ᶜ in the base 145, port 179ᵇ in the gasket 147, port 179 in the seat 138, through the exhaust port 176 of the pilot disc 137 and thence into port 177ᵃ of the seat 138, port 177ᵇ of the gasket 147, port 177ᶜ of the base 145 and thence through passage 180 in said base and through drain conduit 183 to the atmosphere. The valve E thus opens automatically, as shown in Fig. 16, to bleed the water from the pipe section 10 in the event that the valve D leaks, thereby positively preventing back-flow through the unit. The discharge of water from the valve E will also indicate that the valve D is not functioning properly and requires attention.

As a further assumption, if the pressure drop in the supply main X is such that a vacuum condition tends to occur therein, such condition cannot be transmitted through the unit 1 to cause back-siphoning. Whenever a vacuum condition tends to occur in the supply main X of the unit 1, the vacuum breaker valve C will automatically open fully, as indicated in Fig. 16, and vent the supply main X to the atmosphere. Thus, when the pressure in the supply main X drops even very slightly below atmospheric pressure, such condition will be communicated to the diaphragm chamber 47ᶜ of the vacuum breaker valve C and atmospheric pressure acting on the under side of the diaphragm 27ᶜ will effect automatic opening of said valve so that air will be drawn into the supply main X through said valve to positively break any vacuum created therein. As is well known, a vacuum condition in a water supply main not only tends to cause back-siphoning of water into the main, but is dangerous and highly undesirable because of the fact that when the water resumes flow in the main, it will rush to that portion thereof which is under partial vacuum, and the resulting surge is often sufficient to burst the main or seriously damage any valves connected in said main. The present unit positively avoids all such danger.

Assuming that a vacuum condition has occurred in the supply main X and that the valve C has automatically opened to relieve the vacuum condition, as soon as pressure begins to build up in the main X, the air will be displaced and forced out of the main through the vacuum breaker valve C without effecting closing of said valve because the air will flow through the valve without building up any appreciable pressure, but when the water begins to flow through said valve, a substantial frictional resistance to flow is offered so that a hydraulic pressure develops in the inlet chamber 30ᶜ and this pressure readily builds up to a pressure in excess of atmospheric, which is the pressure present in the outlet chamber 31ᶜ. The hydraulic pressure in the inlet 30ᶜ is communicated through the conduit 49ᶜ to the diaphragm pressure chamber 47ᶜ to effect positive closing of the vacuum breaker valve C against the pressure of the water flowing therethrough. It will be noted that in this manner the main X and the valve C are flushed before the valve C is closed.

The creation of a vacuum condition in the line X results in a pressure drop in the chamber 81 of the pressure-responsive device F so that the predominating pressure in the chamber 80 flexes the diaphragm 71 toward the left, as shown in Fig. 16, to effect opening of the bleeder valve E simultaneously with the opening of the vacuum breaker valve C, as will be readily understood from the foregoing description. Thus, the unit 1 is so controlled that the main X is not only vented to the atmosphere to break any vacuum formed therein, but the pipe section 10 is simultaneously drained to eliminate any water that might possibly be back-siphoned through the check valve B into the main X.

After the vacuum breaker valve C has been flushed and closed, as aforedescribed, the pressure in the unit 1 on the inlet side of the check valve B will further build up to the extent that it is greater than that in the outlet chamber 31 of the check valve B, whereupon the check valve B will open to permit flow from the main X into the pipe section 10. Meanwhile, pressure will build up in the chamber 81 of the pressure-responsive device F sufficiently to flex the diaphragm 71 to the right and thereby restore the pilot disc to its original position to effect closing of the bleeder valve E, as aforedescribed. However, it will be understood that the operation of the bleeder valve E is such that water will flow through the pipe section 10 and the valve E to flush them thoroughly before sufficient pressure is built up to effect closing of the valve E through the operation of the pilot valve G. After the bleeder valve E has been closed, pressure will build up in the inlet chamber 30$^d$ of the check valve D until it exceeds the pressure in the outlet chamber 31$^d$, whereupon the check valve B will open and the unit will operate as under normal flow conditions.

The check valve B serves to prevent back-flow in the event that the check valve D leaks, and also serves to prevent back-siphoning in case the pressure in the supply main X drops below that in the service main Y or in the event that a vacuum condition is created in said supply main.

Figure 17 diagrammatically illustrates a modified form of back-flow prevention unit 1$^a$, which is similar in all respects to the back-flow prevention unit 1 already described, with the exception that it includes an additional automatic check valve J interposed between the pipe section 2 and the gate valve A. The object of the third check valve J is to afford safety in the event that both the check valves D and B leak. The check valve J is the same in structure and operation as the check valve B and the unit 1$^a$ functions the same as the unit 1. It will be noted, however, that in the three check valve unit 1$^a$ the valve J will automatically open when a vacuum condition occurs in the main X and permit the vacuum breaker valve C to open and vent said main to the atmosphere. It will be further noted that in the three check valve unit 1$^a$, the pressure-responsive device F is connected across the check valves J and B.

In certain installations it is desirable to have the bleeder valve E of the back-flow protection units 1 and 1$^a$ open only when a substantial excess of pressure above that in the main X occurs in the pipe section 10. The pressure-responsive device F aforedescribed is quite sensitive and, as has been pointed out, will normally operate on a 1 lb. pressure differential. In installations where it is desirable to have the bleeder valve C open only in the event that the pressure in the pipe section 10 exceeds that in the main X by, say about 5 or 10 lbs., a suitable spring S (Fig. 8) is disposed in the chamber 81 between the plate member 83 and the disc 125 so that it normally acts to flex the diaphragm 71 toward the right and thus supplements whatever pressure may be effective in the chamber 81 by virtue of the conduit connection 105 with the intake side of the gate valve A. Thus, if the spring S is a 5 lb. spring, the bleeder valve E will open whenever the pressure in the pipe section 10 is in excess of the combined resistance offered by the spring S and the pressure in the supply main X.

While a certain type of check valve, vacuum breaker valve and bleeder valve have been illustrated herein, it will be understood that changes may be made in the details of construction thereof without departing from the principles of the invention. It will also be understood that certain changes may be made in the details of construction of the automatic control device Z, without altering its principles of operation. Hence, it is contemplated that various changes in construction and arrangement of the various elements of the back-flow prevention units disclosed herein may be made without departing from the spirit of the invention or the scope of the annexed claims.

I claim:

1. A back-flow prevention unit having a supply end and a service end, comprising: means including two automatic check valves arranged in series to normally allow flow only in a direction from said supply end toward said service end and disposed adjacent the supply and service ends of said unit, respectively; means between said check valves providing a space for water; a bleeder valve communicating with said space for effecting draining of water from said space; a control device actuatable independently of said bleeder valve subject to the differential pressure on the inlet side of the automatic check valve at the supply end of said unit and the space between said check valves arranged to control the opening and closing of said bleeder valve in accordance with variations in said differential pressure; and means on the side of the control device subject to said inlet pressure yieldably opposing actuation of said control device by said differential pressure to delay opening of said bleeder valve until the pressure in said space between said check valves is a given predetermined amount in excess of that in the inlet chamber of said check valve at the supply end of said unit, whereby to avoid all unnecessary opening of said bleeder valve and the waste of water incident thereto.

2. A back-flow prevention unit having a supply end and a service end, comprising: means including two automatic check valves arranged in series to normally allow flow only in a direction from said supply end toward said service end and disposed adjacent the supply and service ends of said unit, respectively; means between said check valves providing a space for fluid; a fluid pressure operated bleeder valve communicating with said means for effecting draining of said fluid space, said bleeder valve having pressure chamber means for operating fluid and including an element actuatable by operating fluid in said pressure chamber means to move said element toward valve closing position to control flow through said bleeder valve, said element normally being movable to bleeder valve opening position by the pressure of fluid in said space in the absence of operating fluid pressure in said chamber means; a pressure-responsive device subject to the differential pressure on the opposite sides of the automatic check valve at the supply end of said unit; a pilot valve actuatable by said pressure-responsive device for controlling the admission of operating fluid into and the exhaust of operating fluid from said pressure chamber means of said bleeder valve; and means yieldably opposing actuation of said pilot valve by said pressure-responsive device to delay opening of said bleeder valve until the pressure in said fluid space between said check valves is a given predetermined amount in excess of that in the inlet chamber of said check valve at the supply end of said unit, whereby to avoid all unnecessary opening of said bleeder valve and the waste of fluid incident thereto.

3. A back-flow prevention unit having a supply end and a service end, comprising: means including two automatic check valves arranged in series to normally allow flow only in a direction from said supply end toward said service end and disposed adjacent the supply and service ends of said unit, respectively, each check valve having an inlet chamber and an outlet chamber and being arranged to close automatically whenever the pressure in the outlet chamber thereof exceeds that in the inlet chamber thereof; means between said check valves providing a space for fluid; a fluid pressure operated bleeder valve communicating with said means for effecting draining of said fluid space, said bleeder valve having pressure chamber means for operating fluid and including an element actuatable by operating fluid in said pressure chamber means acting on one side thereof arranged to seat against line pressure in said space acting on the opposite side thereof; a sensitive, pressure-responsive device subject to the differential pressure on the opposite sides of the check valve at the supply end of said unit; and a pilot valve including a ported element actuatable by said pressure-responsive device in response to changes in said differential pressure for controlling the admission of operating fluid into, and the exhaust of operating fluid from, said pressure chamber means of said bleeder valve, said pilot valve being arranged to exhaust operating fluid quickly from said pressure chamber means, as a result of the pressure of the fluid in said space acting on said opposite side of said valve element, to effect quick opening of said bleeder valve when the pressure in said fluid space between said check valves is greater than the pressure in the inlet chamber of said check valve at the supply end of said unit, and to relatively gradually admit operating fluid into said pressure chamber means to act on said one side of said valve element to effect relatively gradual positive closing of said bleeder valve against line pressure to permit flushing of said fluid space and said bleeder valve prior to complete closing of said bleeder valve when the stated pressure conditions are reversed.

4. A back-flow prevention unit, comprising: two automatic check valves, each having an inlet and an outlet and being arranged to close automatically whenever the pressure in their respective outlets exceeds that in their respective inlets; a conduit interconnecting the outlet end of one of said check valves with the inlet end of the other of said check valves; a fluid pressure operated bleeder valve connected with said conduit for effecting draining thereof, said bleeder valve having pressure chamber means for operating fluid and including an element, operable by said operating fluid, arranged to seat under the influence of said operating fluid against line pressure and to be biased to open position by pressure in said conduit in the absence of said operating fluid pressure; and means including a sensitive, pressure-responsive device and a ported pilot valve actuated thereby in accordance with the pressure differential across said conduit and the inlet of said one check valve for controlling the admission of operating fluid into, and the exhaust of operating fluid from, said pressure chamber means of said bleeder valve, said pilot valve being arranged to exhaust operating fluid rapidly from said pressure chamber means to allow quick opening of said bleeder valve when the pressure in the conduit between said check valves is greater than the pressure in the inlet of said one check valve and relatively gradually admit operating fluid into said pressure chamber means to effect relatively gradual closing of said bleeder valve against line pressure to permit flushing of said bleeder valve by flow of water therethrough under line pressure prior to complete closing of said bleeder valve when the stated pressure conditions are reversed.

5. A back-flow prevention unit, having a supply end and a service end, comprising: a pressure-responsive vacuum breaker adjacent the supply end of said unit having an inlet normally subject to line pressure and an outlet communicating with the atmosphere, said vacuum breaker being arranged to close automatically when the pressure in said inlet exceeds atmospheric pressure and to open automatically when the pressure in said inlet is less than atmospheric pressure; a first check valve having an inlet and an outlet, with the inlet end thereof communicating with the inlet end of said vacuum breaker; a second check valve arranged in series relation with said first check valve; means between said check valves providing a space for fluid; a fluid pressure operable bleeder valve having an inlet communicating with said fluid space and having an outlet communicating with the atmosphere, said bleeder valve having pressure chamber means for operating fluid and including an element actuatable toward seating position by operating fluid under pressure in said pressure chamber means, said element being movable to open position by the pressure of fluid in said space; a pilot valve having a ported element arranged to control the exhaust of operating fluid from, and the admission of operating fluid into, said pressure chamber means of said bleeder valve to allow opening and to effect closing, respectively, of said bleeder valve; and sensitive, pressure-responsive means having chambers respectively subject to the pressure at the supply end of said unit and the pressure in said fluid space and including an element between said chambers connected with said ported pilot element for actuating said pilot valve to control the opening and closing of said bleeder valve in accordance with variations in the pressure differential across said first check valve, whereby when a vacuum condition occurs at the supply end of said unit, said vacuum breaker will automatically open and vent the supply end of said unit to the atmosphere and thereby prevent back-siphoning through said unit and also increase the pressure in one chamber of said pressure-responsive means to that of the atmosphere through said vacuum breaker, thereby effecting actuation of said pilot valve then being actuatable by said pressure-responsive means in response to a predetermined pressure in said fluid space in excess of atmospheric pressure to exhaust operating fluid from said pressure chamber means of said bleeder valve to allow opening of said bleeder valve to the atmosphere subsequent to the time that said vacuum breaker is opened, said pressure-responsive vacuum breaker and pressure-operated bleeder valve remaining open to be successively flushed by line flow and to be closed automatically after the atmospheric air admitted into said unit has been displaced therefrom by said line flow and a hydraulic pressure in excess of atmospheric air pressure has been restored in said inlet of said vacuum breaker and in said chamber of said pressure-responsive device subject to the pressure at the supply end of said unit.

6. A back-flow prevention unit having a supply end and a service end, comprising: two automatic check valves; means between said check valves providing a space for liquid, said check valves being arranged in series to normally allow flow only in a direction from said supply end toward said service end; a bleeder valve communicating with said space for draining liquid from said space; an automatic vacuum breaker valve communicating with the inlet side of the check valve at the supply end of said unit adapted to vent said supply end of said unit to the atmosphere when a vacuum condition occurs in use at said supply end of said unit; and means responsive in its action to the opening of said automatic vacuum breaker valve and the venting of the supply end of said unit to the atmosphere arranged to effect opening of said bleeder valve when the pressure in said space exceeds atmospheric pressure by a predetermined amount, whereby to prevent back-siphoning of liquid through said unit.

7. A back-flow prevention unit having a supply end and a service end, comprising: two automatic check valves; means between said check valves providing a space through which liquid can flow from one check valve to the other, said check valves being arranged in series to normally allow flow only in a direction from said supply end toward said service end; a bleeder valve having an inlet communicating with said space for effecting the draining of liquid therefrom; pressure-responsive means for controlling the opening and closing of said bleeder valve, said pressure-responsive means including a diaphragm, one side of which is subject to the pressure in said space, and the other side of which is subject to the pressure at the inlet side of the check valve at the supply end of said unit, said pressure-responsive means being arranged to maintain said bleeder valve closed so long as the latter pressure exceeds the pressure in said space by a predetermined amount; and a vacuum breaker valve communicating with said unit at the inlet side of said last-mentioned check valve adapted to be maintained closed by line pressure slightly above atmospheric pressure and to automatically open under atmospheric pressure when a vacuum condition occurs in use to thereby vent the inlet side of said check valve and said other side of said diaphragm to the atmosphere through said vacuum breaker valve, whereby to allow opening of said bleeder valve when the supply end of said unit has been vented to atmosphere and the pressure in said space exceeds atmospheric pressure by said predetermined amount.

8. A back-flow prevention unit having a supply end and a service end, comprising: two automatic check valves; means between said check valves providing a space through which liquid can flow from one check valve to the other, said check valves being arranged in series to normally allow flow only in a direction from said supply end toward said service end; a bleeder valve having an inlet communicating with said space for effecting the draining of liquid therefrom; pressure-responsive means for controlling the opening and closing of said bleeder valve, said pressure-responsive means including a diaphragm, one side of which is subject to the pressure in said space, and the other side of which is subject to the pressure at the inlet side of the check valve at the supply end of said unit, means on said other side of said diaphragm yieldably opposing flexing thereof to prevent the opening of said bleeder valve until a predetermined preponderance of pressure exists on said one side of said diaphragm; a vacuum breaker valve communicating with said unit at the inlet side of said last-mentioned check valve adapted to open, when a vacuum condition occurs in use, to vent the inlet side of said check valve and said other side of said diaphragm to the atmosphere.

9. A back-flow prevention unit having a supply end and a service end, comprising: two automatic check valves; a conduit interconnecting said check valves, said check valves being arranged in series to normally allow flow only in a direction from said supply end toward said service end; a fluid pressure operated bleeder valve connected with said conduit for effecting the draining of liquid therefrom, said bleeder valve normally being held closed by fluid under pressure and being biased to open position by pressure in said conduit in the absence of said closing pressure; a pilot valve controlling the supply of operating fluid to and the exhaust of operating fluid from said bleeder valve; means for actuating said pilot valve, said means being pressure-responsive and connected with said unit so that it is operated by the differential pressure across the automatic check valve at the supply end of said unit; and means yieldably opposing actuation of said last-mentioned means and delaying opening of said bleeder valve until the difference in pressures is a given predetermined amount.

10. A back-flow prevention unit having a supply end and a service end, comprising: two automatic check valves; means providing a space for liquid between said check valves, said check valves being arranged in series to normally allow flow only in a direction from said supply end toward said service end; a fluid pressure operated bleeder valve communicating with said space to effect the draining of liquid therefrom, said bleeder valve having a chamber for operating fluid under pressure and normally being maintained closed by the pressure of said fluid; a pressure-responsive device connected with said unit so that it is subject to the differential pressure on the inlet and outlet sides of the check valve at the supply end of said unit; a normally closed automatic vacuum breaker valve communicating with the inlet side of the check valve at the supply end of said unit operable to vent the supply end of said unit and one side of said pressure-responsive device to the atmosphere when a vacuum condition occurs in use at the inlet side of said last-mentioned check valve; and a pilot valve connected with said pressure chamber of said bleeder valve for controlling said bleeder valve, said pilot valve being actuatable by said pressure-responsive device to exhaust the operating fluid from said pressure chamber of said bleeder valve to allow opening of said bleeder valve upon opening of said vacuum breaker valve and when said one side of said pressure-responsive device is vented to the atmosphere and the pressure on the other side of said device exceeds atmospheric pressure by a predetermined amount, whereby to prevent back-siphoning through said unit.

11. A back-flow prevention unit as defined in claim 10 in which the pressure-responsive device includes means yieldably opposing actuation of said pilot valve until the pressure of the liquid in the space between the check valves is a given amount above that at the inlet side of the check valve at the supply end of the unit.

12. In two interconnected conduits for fluid, means for blocking a contaminating backflow of fluid from one conduit to the other comprising a valve for controlling flow between said conduits, means for automatically closing said flow-controlling valve when conditions promotive of contaminating backflow occur, means cooperating with said flow-controlling valve and a portion of the conduit downstream thereof providing a confined space in the line of flow through the conduits, a drain having a drain valve connected to said space, operating means including hydraulically controlled means for opening said drain valve, when said conditions effecting a closing of said flow-controlling valve occur, to establish an air gap in said space, and reclosing said drain valve when said flow-controlling valve reopens, said operating means including means to retard the reclosing of said drain valve, whereby to provide a flushing of the conduit portion in which said air gap exists before normal flow is re-established between said conduits.

13. In two interconnected conduits for fluid, means for blocking a contaminating backflow of fluid from one conduit to the other comprising a valve for controlling flow between said conduits, means for automatically closing said flow-controlling valve when conditions promotive of said contaminating backflow occur, means cooperating with said flow-controlling valve and a portion of the conduit downstream thereof providing a confined space in the line of flow through the conduits, a drain having a drain valve connected to said space, means for opening said drain valve, when said conditions effecting a closing of said flow-controlling valve occur, to establish an air gap in said confined space, and reclosing said drain valve when said flow-controlling valve reopens, said last mentioned means including means to retard its operation in reclosing said drain valve whereby to provide a flushing of the conduit portion in which said air gap exists before normal flow is re-established between said conduits.

14. In two interconnected conduits for fluid, means for blocking a contaminating backflow of fluid from one conduit to the other comprising two flow-controlling valves arranged in succession in the conduit in which contaminating backflow is to be blocked, means for automatically closing said valves when conditions promotive of a contaminating backflow occur and thereby provide a confined space in the conduit portion between said flow-controlling valves, a vent and a vent valve communicating with said space for establishing an air gap in such space when said conditions effecting a closing of said flow-controlling valves occur, operating means including hydraulically controlled means for opening said vent valve when the upstream flow-controlling valve closes and reclosing said vent valve when said upstream flow-controlling valve reopens, said operating means including means for retarding the reclosing of said vent valve, whereby to provide a flushing of the conduit portion in which said air gap exists before normal flow is re-established between said conduits.

15. In two interconnected conduits for fluid, means for blocking a contaminating backflow of fluid from one conduit to the other comprising two flow-controlling valves arranged in succession in the conduit in which contaminating backflow is to be blocked, means for automatically closing said valves when conditions promotive of a contaminating backflow occur and thereby provide a confined space in the conduit portion between said flow-controlling valves, a vent and a vent valve communicating with said space for establishing an air gap in such space when said conditions effecting a closing of said flow-controlling valves occur, means for opening said vent valve when the upstream flow-controlling valve closes, and reclosing said vent valve when said upstream flow-controlling valve reopens, said last mentioned means including means to retard its operation in reclosing said vent valve whereby to provide a flushing of said conduit portion in which said air gap exists before normal flow is re-established between said conduits.

DONALD G. GRISWOLD.

References Cited in the file of this patent

UNITED STATES PATENTS

| Number | Name | Date |
| --- | --- | --- |
| 926,968 | Stickdorn | July 6, 1909 |
| 1,105,991 | Miller | Aug. 4, 1914 |
| 1,156,447 | Underwood | Oct. 12, 1915 |
| 1,606,245 | Lang | Nov. 9, 1926 |
| 1,755,993 | Kelley | Apr. 22, 1930 |
| 2,146,204 | Dore | Feb. 7, 1939 |
| 2,292,871 | Dunn | Aug. 11, 1942 |
| 2,310,586 | Lohman | Feb. 9, 1943 |
| 2,328,118 | Ahlport | Aug. 31, 1943 |
| 2,366,144 | Griswold | Dec. 26, 1944 |
| 2,372,940 | Ellis | Apr. 3, 1945 |
| 2,377,227 | Griswold | May 29, 1945 |
| 2,389,413 | Carlton | Nov. 20, 1945 |

FOREIGN PATENTS

| Number | Country | Date |
| --- | --- | --- |
| 256,920 | Italy | 1928 |